United States Patent [19]

Elston

[11] 4,031,195

[45] June 21, 1977

[54] REGENERATIVE METHOD REMOVAL OF SULFUR DIOXIDE FROM STACK GASES

[75] Inventor: Lewis W. Elston, Atlanta, Ga.

[73] Assignee: Georgia Tech Research Institute, Atlanta, Ga.

[22] Filed: Feb. 4, 1976

[21] Appl. No.: 655,167

Related U.S. Application Data

[63] Continuation-in-part of Ser. No. 359,997, May 14, 1973, abandoned.

[52] U.S. Cl. .............................. 423/554; 423/242; 423/244; 423/555
[51] Int. Cl.$^2$ ........................................ B01D 53/34
[58] Field of Search .......... 423/554, 242, 244, 583, 423/574

[56] References Cited

UNITED STATES PATENTS

| 3,733,393 | 5/1973 | Couilland et al. .............. 423/242 X |
| 3,760,061 | 9/1973 | Hammond ......................... 423/242 |

OTHER PUBLICATIONS

Kirk–Othmer; *Encyclopedia of Chemical Technology;* vol. 14, Interscience Pub., 1969.
Mellor, J. W.; *A Comprehensive Treatise on Inorganic and Theoretical Chemistry*, vol. X., Longmans Green; N.Y., 1930; p. 209.
Heslop et al.; *Inorganic Chemistry;* Elsevier Pub. Co.; N. Y., 1963, p. 259.

*Primary Examiner*—G. O. Peters
*Attorney, Agent, or Firm*—Newton, Hopkins & Ormsby

[57] ABSTRACT

Sulfur dioxide is removed from stack gases by absorption in an aqueous medium, the preferred embodiment containing a chemical oxidant which generates hydrogen peroxide on a demand that equals the rate sulfur dioxide is absorbed into the medium whereby the absorbed sulfur dioxide is converted to sulfate form. The converted sulfur dioxide is removed in the form of an alkaline earth metal sulfate precipitate and spent oxidant is regenerated for reuse. In the other illustrated embodiments, the aqueous medium is maintained acidic from the start-up of the system. Barium peroxide is the preferred oxidant and acts both as oxidant and precipitant. Alternately, the oxidant and precipitant may be separate compounds.

3 Claims, 8 Drawing Figures

FIG 8 ed during regeneration, only about 85% of the sulfur dioxide will be removed; the catalyst requires preheating to elevated temperatures (i.e. 700–750° F); the efficiency of the system is strongly upon upn optimum rate of plant operation and drops sharply when the plant load is other than at its optimum level; and the end product is 78 percent sulfuric acid which is too dilute for many industrial uses and is economically unsuitable for shipping any great distance.

REGENERATIVE METHOD REMOVAL OF SULFUR DIOXIDE FROM STACK GASES

CROSS-REFERENCE TO RELATED APPLICATION

This is a continuation-in-part of my application Ser. No. 359,997, filed May 14, 1973, now abandoned.

BACKGROUND OF THE INVENTION

The problem of removal of sulfur dioxide from stack gases has been the subject of many proposals over the years. It has been recently reported (*Chemical Week*, Feb. 10, 1971) that sulfur dioxide emissions from power plants, smelters, acid plants, etc. amounts currently to 37 million long tons per year and is expected to reach 61 million long tons per year by 1980. It is obvious from these figures that past attempts to solve this problem, for a variety of reasons, have failed. In some instances, the methods are effective but are prohibitively expensive to build and/or to operate. For example, Karlsson, U.S. Pat. No. 3,436,192, operates on the principle of catalytic conversion of sulfur dioxide to sulfur trioxide and the subsequent conversion of the sulfur trioxide to sulfuric acid. Aside from the fact that the vanadium pentoxide catalyst is expensive and that substantial amounts of this catalyst are lost by attrition during regeneration, only about 85% of the sulfur dioxide will be removed; the catalyst requires preheating to elevated temperatures (i.e. 700–750° F); the efficiency of the system is strongly upon upn optimum rate of plant operation and drops sharply when the plant load is other than at its optimum level; and the end product is 78 percent sulfuric acid which is too dilute for many industrial uses and is economically unsuitable for shipping any great distance.

Many other systems have been proposed in which chemical conversion of sulfur dioxide is involved. Fatlinger et al., U.S. Pat. No. 3,510,253, is an example in which stoichiometric amounts of ammonia are used to form ammonium sulfite or ammonium bisulfite which may be recovered and by reaction with a strong base converted into a corresponding other sulfite with liberation of ammonia for recycle purposes. Alternatively, the sulfite solution may be admixed with sulfuric acid to convert the sulfite to ammonium sulfate with simultaneous liberation of sulfur dioxide and the liquor recycled as a pre-stage system prior to the ammonia addition stage. In any case, an on-site sulfuric acid plant is required to convert sulfuric acid dioxide to the sulfuric acid used to displace sulfur dioxide from the scrubbing liquor or an independent sulfuric acid supply would be required should the end product be sulfur dioxide or ammonium sulfite.

The Fatlinger et al. patent represents but one approach in the chemical conversion area which, in general, involves the formation of a sulfite. For example, the Bevans et al. patent, U.S. Pat. No. 3,386,798, involves the conversion of calcium chloride to calcium sulfite and calcium sulfate; the Clarke patent, U.S. Pat. No. 2,128,027, involves the conversion of an organic base to the corresponding sulfite; and Lessing and Nonhebal et al., U.S. Pat. Nos. 2.080,779 and 2,090,142, respectively, both involve conversion of lime or limestone to calcium sulfite and calcium sulfate. In all of these processes, although it appears not to have been recognized, a serious limitation exists due to chemical equilibrium problems arising between the sulfur dioxide and the sulfite produced, i.e. a significant fraction of the sulfur dioxide is not absorbed because of the chemistry of the reaction even in a well engineered system.

That is to say, sulfur dioxide is readily expelled from sulfites by heat or by strong mineral acids. As a matter of fact, a standard laboratory procedure for preparation of sulfur dioxide involves heating an acidic aqueous solution of sodium bisulfite. Thus, prior art wet scrubbers which absorb sulfur dioxide with an acidic aqueous medium to form sulfites are propense to allowing substantial amount of sulfur dioxide to escape into the atmosphere. A number of systems employ an alkaline wet scrubber medium which successfully minimizes expulsion of sulfur dioxide by acid displacement and therefore overcomes this disadvantage of acidic mediums. However, alkaline wet scrubber mediums require a slurry form of medium containing an excess of alkaline earth material sufficient to neutralize the carbon dioxide as well as the sulfur dioxide in the effluent gas. This entails using an excess of reagent as well as adding to the engineering problems involved by the requirement for circulating a slurry.

Couillaud et al., U.S. Pat. No. 3,733,393, discloses the oxidation of sulfur dioxide by a concentrated solution of hydrogen peroxide; Hammond, U.S. Pat. No. 3,760,061, teaches that sulfur dioxide can be oxidized to sulfuric acid by contacting the sulfur dioxide with a solution of sulfuric acid and hydrogen peroxide; and Burrage, U.S. Pat. No. 2,165,784, teaches the removal of sulfur compounds from acidcontaining gases by contacting the gases with an aqueous solution of the acid containing a salt which will form an insoluble surface and the insoluble sulfate or a catalyst adapted to oxidize sulfites into sulfates.

BRIEF SUMMARY OF THE INVENTION

It is of primary concern in connection with this invention to provide a system which is free from the disadvantages associated with prior systems which employ an acid wet scrubbing medium, an alkaline wet scrubbing medium, and mediums containing high concentrations of hydrogen peroxide.

According to this invention, the displacement of sulfur dioxide by heat or by acid is eliminated whereby in a wet scrubbing medium, absorbed sulfur dioxide is converted to non-volatile surface. This conversion is effected by the presence of an oxidant in the scrubbing medium, the oxidant being barium oxide which releases hydrogen peroxide only in response to a demand initiated by absorption of sulfur dioxide.

This invention is concerned not only with a system which is highly effective in removing sulfur dioxide from stack gases, but also with a regenerative system effective to recover spent oxidant. The regenerative aspect also provides a system which is continuously operable and which may be adjusted in conformity with fluctuations in demand.

Basically, in the preferred form, the invention involves the chemical oxidation of absorbed sulfur dioxide in an aqueous solution containing barium oxide whereby hydrogen peroxide is generated to convert the sulfur dioxide to a precipitate, barium sulfate; removal of the precipitate; and regeneration of the scrubbing solution oxidant. In the other illustrative embodiments, various oxidants which are capable of regeneration are utilized in solutions which are maintained acidic from the start-up of the absorption of the sulfur dioxide, as opposed to the barium oxide solution which is basic at start-up but becomes acidic at steady state. In some instances, provisions are made for conversion and recovery of constituents of the precipitate and the oxidant also may act as the precipitant.

DETAILED DESCRIPTION OF THE INVENTION

Figure 1:
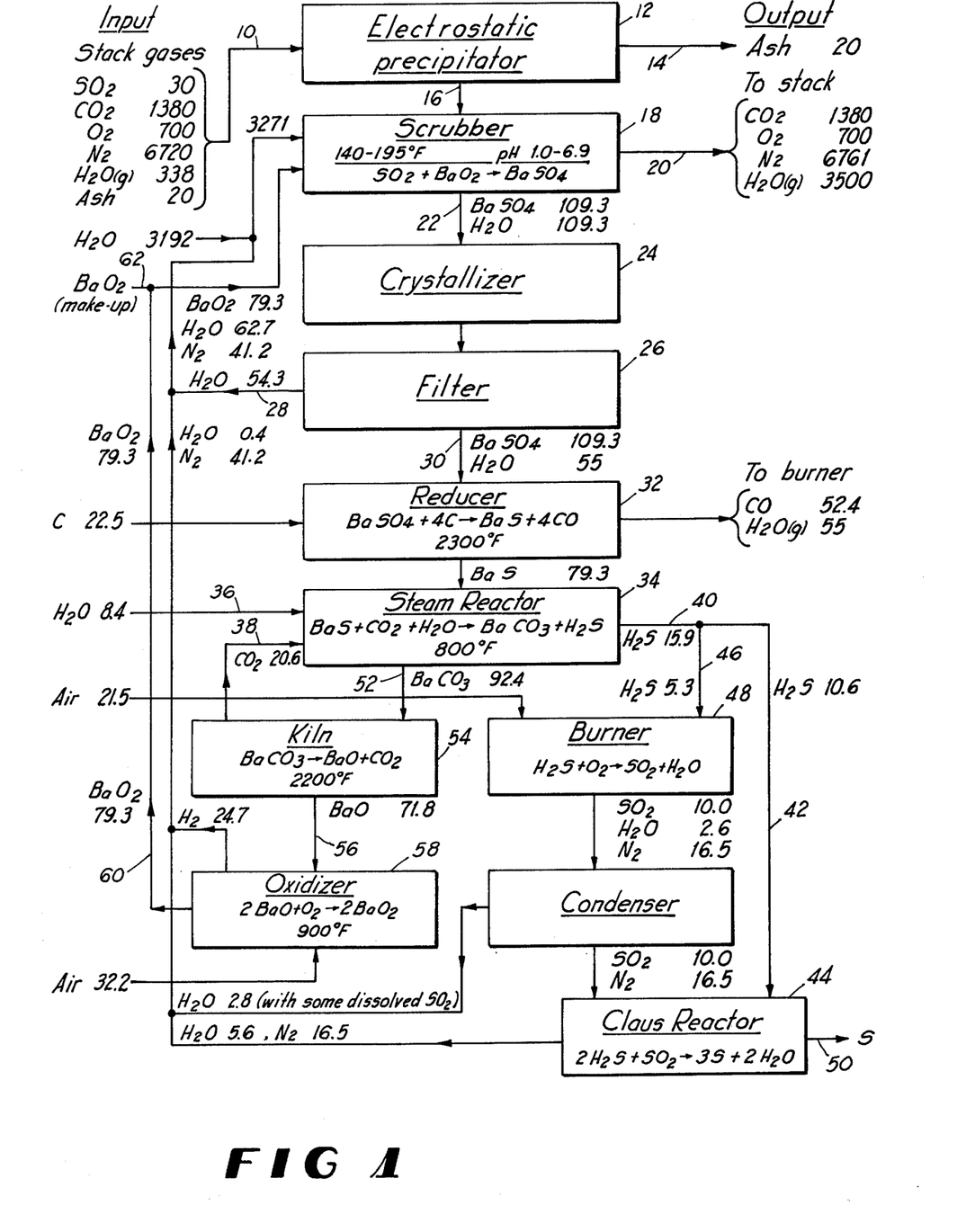
FIG. 1 is a flow diagram illustrating a preferred form of the invention utilizing barium peroxide as the oxidant precipitant.

In the embodiment of the invention shown in FIG. 1, a flow diagram is illustrated in which barium peroxide is used as oxidant-precipitant and all numerical values of flow are in tons per day in conjunction with a 100 MW power station burning coal containing 3.2% sulfur.

The effluent gases at 10 are preferably passed first through an electrostatic precipitator 12 for removal of fly ash as indicated at 14 and the residual gases are passed as indicated at 16 to a wet scrubber 18 wherein the effluent gases are contacted with a scrubbing liquid which is an aqueous medium containing barium peroxide chemical oxidant. Barium oxide is an insoluble oxidizing agent which may be in suspension within the aqueous medium or the aqueous medium might be in contact with a bed of barium peroxide.

The barium peroxide generates hydrogen peroxide into the medium at a rate equal to or controlled by the rate of absorption of sulfur dioxide into the medium. Hydrogen peroxide is released from the insoluble barium peroxide by a sequence of reactions whose results are equivalent to the following:

1. Absorption step: $SO_2 + H_2O = 2H^+ + SO_3^=$
2. Solution step: $H_2SO_3 + BaO_2 \rightleftharpoons Ba^{++} + SO_3^= + H_2O_2$
3. Oxidation step: $H_2O_2 + H_2SO_3 = H_2O + H_2SO_4$
4. Precipitation step: $Ba^{++} + SO_4^= = BaSO_4$ Continuous removal of the absorbed sulfur dioxide as barium sulfate (step 4) drives the absorption reaction (step 1) to the right so that a high concentration of hydrogen peroxide is not required to drive the absorption step.

In the absence of an acid, e.g. at system start-up, the aqueous medium in contact with the barium peroxide is strongly alkaline, having a pH greater than 10. As sulfur dioxide is absorbed, the pH of the aqueous medium falls. The initial reactions include precipitation of barium carbonate when a mixed stream of carbon dioxide, sulfur dioxide, and air as passed through the aqueous medium.

As the pH of the aqueous scrubbing medium drops into the acid range (steady state), the medium no longer absorbs carbon dioxide from the gas stream, and the barium carbonate initially precipitated is decomposed by the reaction:

$$BaCO_3 + H_2SO_4 \rightarrow BaSO_4(s) + CO_2 \text{ (gas)}$$

In summary, the aqueous scrubbing medium in contact with sulfur dioxide and carbon dioxide in the gas stream and solid barium peroxide is held in a dynamic balance in the range of pH 1 to pH 6.9 while the system is in operation with the preferred pH being 3. Thus, in the present invention, sulfur dioxide can readily be absorbed into a weak acid solution containing only traces of peroxide. Carbon dioxide, of course, is not absorbed into an acid aqueous medium, and carbonates in contact with a solution of a strong acid are decomposed, so that costly barium salt is not consumed in the precipitation of carbonate.

One of the advantages of the controlled release rate of peroxide is the economy in the use of the costly oxidant, e.g., the loss at ambient pressure of costly hydrogen peroxide by evaporation from a concentrated solution or by decomposition mechanisms other than the desired oxidation step is virtually eliminated.

Referring to FIG. 1, the effluent gases with sulfur dioxide removed therefrom are passed to the atmosphere as indicated at 20. The wet scrubbing medium containing the converted sulfur dioxide is passed as indicated at 22 to a crystallizer 24 and then to a filter 26 from which some water is recycled in the system as indicated at 28 and wherein the barium sulfate enriched medium is passed at 30 to the reducer 32. The reducer 32 is of well known form as is used in the commercial reduction of barite with coal. The ratio of carbon to barium sulfate is about double the theoretical requirement and the barium sulfide produced is converted into barium carbonate in the steam reactor 32 by treatment with steam introduced at 36 and carbon dioxide introduced at 38. The by-product hydrogen sulfide at 40 is split to pass some of it at 42 to the Claus reactor 44 whereas the remainder at 46 is burned in the burner 48 to produce sulfur dioxide which is reacted with the remainder of the hydrogen sulfide in the Claus reactor 44 to form elemental sulfur as a by-product at 50.

The barium carbonate produced by the reactor 34 is passed at 52 to the kiln 54 which effects the thermal decomposition of the barium carbonate to yield the carbon dioxide at 38 which is utilized in the steam reactor 34 and the barium oxide at 56 is oxidized in the oxidizer 58 to complete the regeneration of barium peroxide oxidant which is then recycled at 60 back to the wet scrubber 18. Make-up oxidant as may be required is applied at the line 62.

It will be appreciated that the basic principles illustrated in FIG. 1 involve the elimination of problems concerning equilibrium of sulfur dioxide absorbed in the wet scrubbing medium. These problems are eliminated by maintaining the wet scrubbing medium acidic as the system reaches a steady state and by providing sufficient chemical oxidant in the medium to release hydrogen peroxide only in an amount sufficient to convert the absorbed sulfur dioxide to sulfate form. The converted sulfur dioxide is then precipitated as an alkaline earth metal sulfate. In FIG. 1, the oxidant acts also as precipitant and is regenerated directly from the alkaline earth metal salt, whereas in other systems of this invention other routes may be followed without departing from the basic concepts herein.

Figure 2:
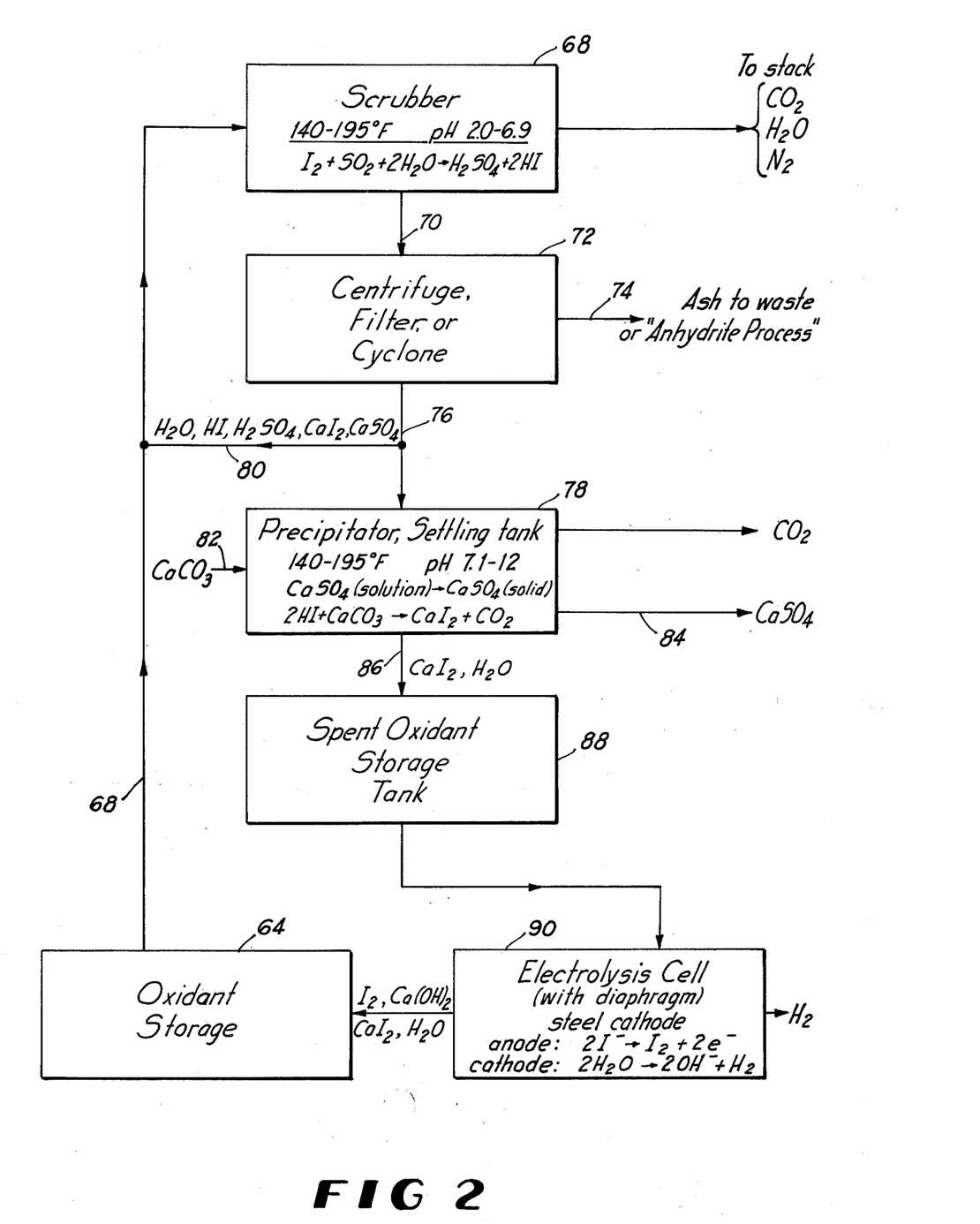
FIG. 2 is a flow diagram showing a system utilizing iodine as oxidant and limestone or calcium carbonate as precipitant.

For example, the system shown in FIG. 2 utilizes iodine in the aqueous acidic scrubbing medium as oxidant, the medium being maintained acidic from the start-up of the system. As shown, the oxidant is stored in a suitable tank 64 and is directed to the scrubber 66 through the line 68. In this case, the sulfur dioxide which is absorbed is converted to sulfuric acid. To prevent escape of iodine vapor, the amount of iodine in the scrubber must be equal to or slightly less than the stoichiometric amount required to combine with the absorbed sulfur dioxide and the iodine concentration in the scrubber should be 0.001–0.2% (W/V). The scrubbing medium is discharged through the line 70 to a suitable separating device 72 which may be a centrifuge, filter or cyclone which removes the fly ash as indicated by the line 74 and the clarified medium discharged at 76 is discharged to the precipitator settling tank 78. Sufficient amount of the clarified medium is recycled in the line 80 back to the wet scrubber so as to maintain the pH in the scrubber at the desired value which, as noted, may be between pH 2.0–6.9.

In the system of FIG. 2, the precipitant used is calcium carbonate or limestone and is introduced as indicated at 82 into the settling tank 78 in amount sufficient to neutralize the acidic scrubbing medium and cause it to go to the basic side as indicated. The converted sulfur dioxide is thus precipitated as calcium sulfate and is removed from the system is indicated at the line 84. This by-product may be used in any desired fashion as for example in the conventional anhydrite process.

The underflow at 86 is collected in a spent oxidant storage tank 88 and is ultimately directed to an electrolysis cell 90 which, for example, may be operated intermittently when spinning power reserve is available. The spent oxidant is regenerated in the electrolysis cell 90 and is cycled to the oxidant storage tank 64 as previously noted.

Figure 3:
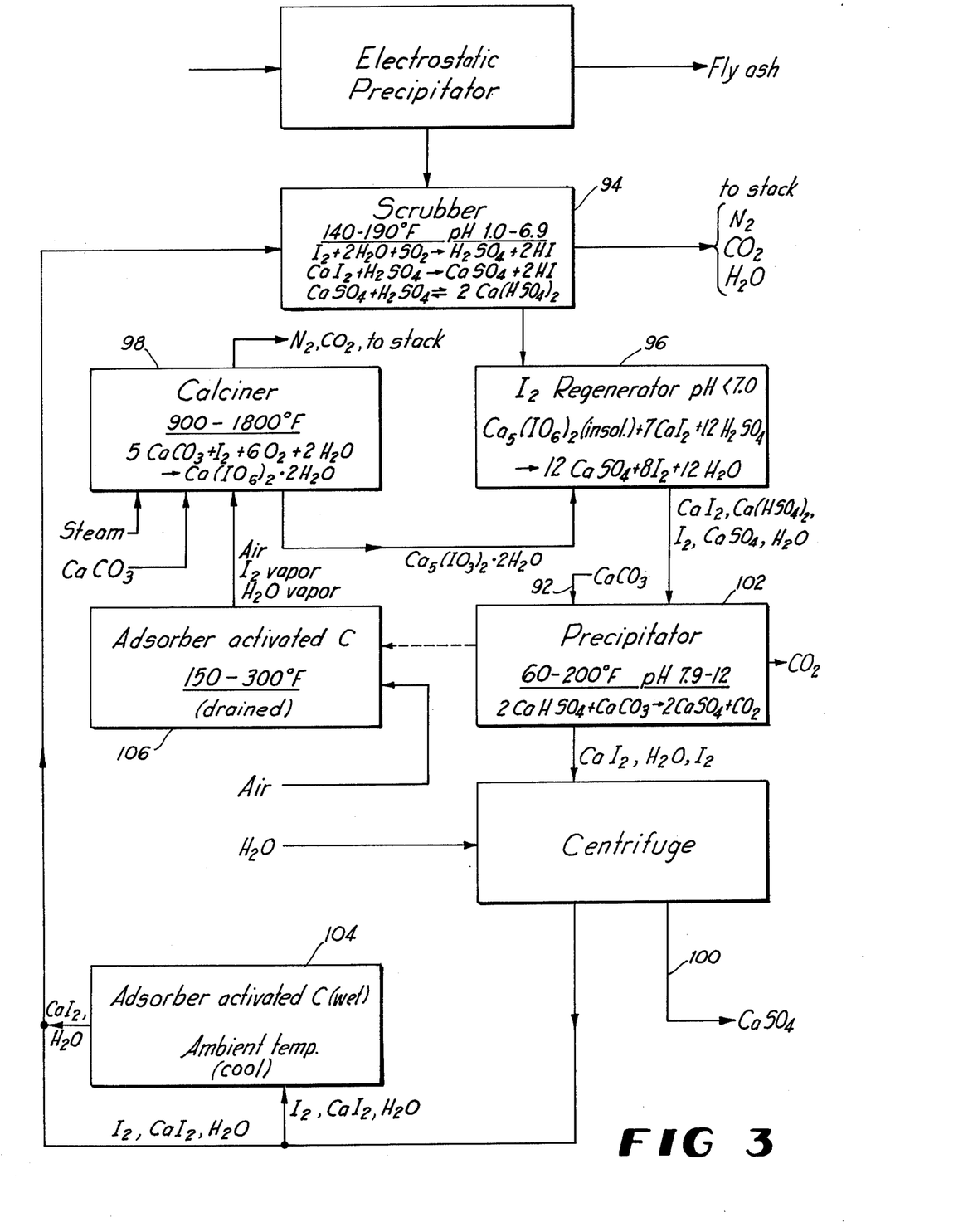
FIG. 3 is a flow diagram similar to FIG. 2 but showing a different method of regeneration of oxidant.

FIG. 3 illustrates a further modified form of the system in which iodine is again used as oxidant and wherein calcium carbonate or limestone at 92 is employed as precipitant. Oxidant regeneration however, takes place directly after the scrubber 94 and is effected in the regenerator 96 in conjunction with the calciner 98. Again, the converted sulfur dioxide ultimately is removed as calcium sulfate at the line 100 after precipitation thereof in the precipitator 102. The flow scheme is only one of many possible regenerating arrangements. As is shown, the periodate-iodide reaction is carried only to partial completion so that sufficient iodide remains to prevent precipitation of the liberated iodine. By operating the regenerator at a higher temperature and increasing the periodate concentration, reaction time, etc., the iodine vapor could be swept into an activated charcoal adsorber 104 at a lower temperature by a stream of air or directly into the calciner 98. In the system shown, there is also a further absorber 106 and the advantage of the scheme illustrated is that any incompletely reacted periodate or iodate carried from a regenerator could react further with the excess iodide present to form iodine solution for recycling. Iodine, though very slightly soluble in dilute acid or bases, is very soluble in iodide solutions. As shown, the adsorbers 104 and 106 would consist of two or more units. Each unit could be cooled and placed in the effluent stream and allowed to collect iodine. The adsorber 106 could then be drained and heated and the sublimed iodine swept into the calciner 98 by a stream of air as indicated. This mode of operation minimizes carbon loss by attrition and transfer and permits operation of the relatively small calciner on a continuous rather than intermittent basis.

Figure 4:
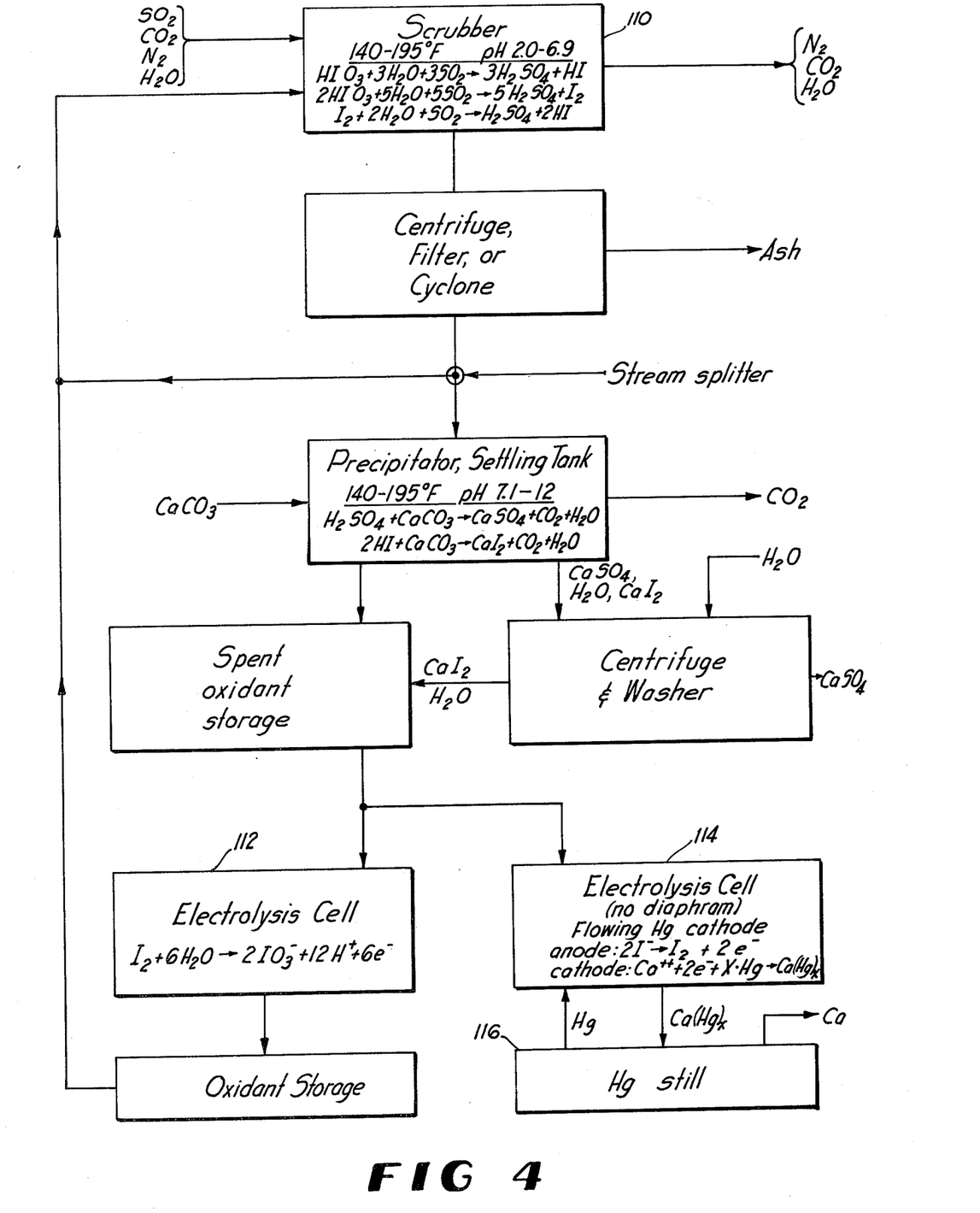
FIG. 4 is a flow diagram illustrating a system employing an iodate oxidant.

In the system of FIG. 4, an iodate oxidant is utilized in the scrubber 110. In this case, regeneration of the spent oxidant is achieved solely by electrolytic means. As shown, some of the spent oxidant is regenerated in the electrolysis cell 112 whereas the system also shows a secondary electrolysis cell 114 which operates in conjunction with the mercury still 116 to recover metallic calcium as indicated at 118 in order to recover a commercially valuable by-product.

Figure 5:
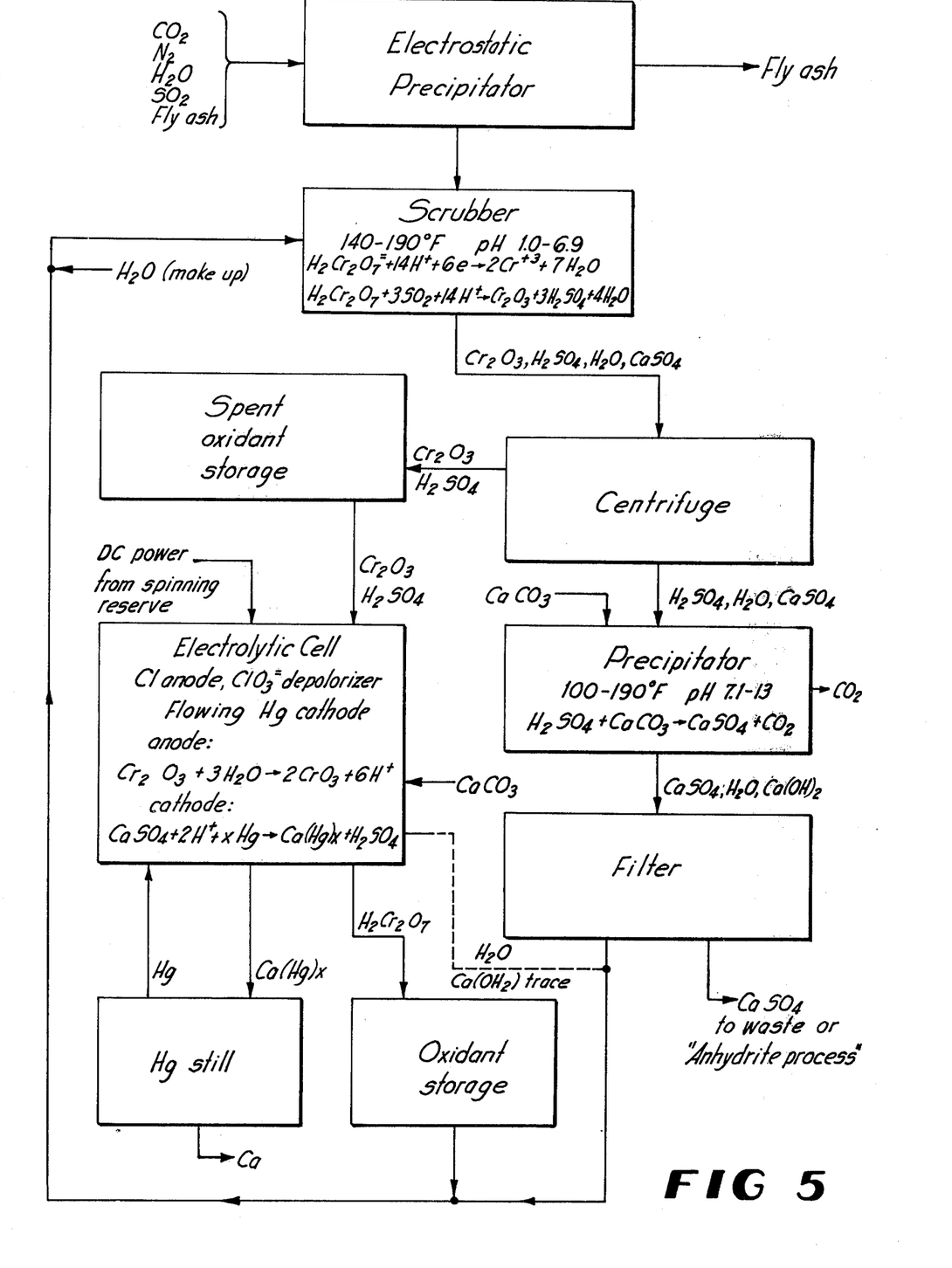
FIG. 5 is a flow diagram illustrating a system employing a chromate oxidant.
Figure 6:
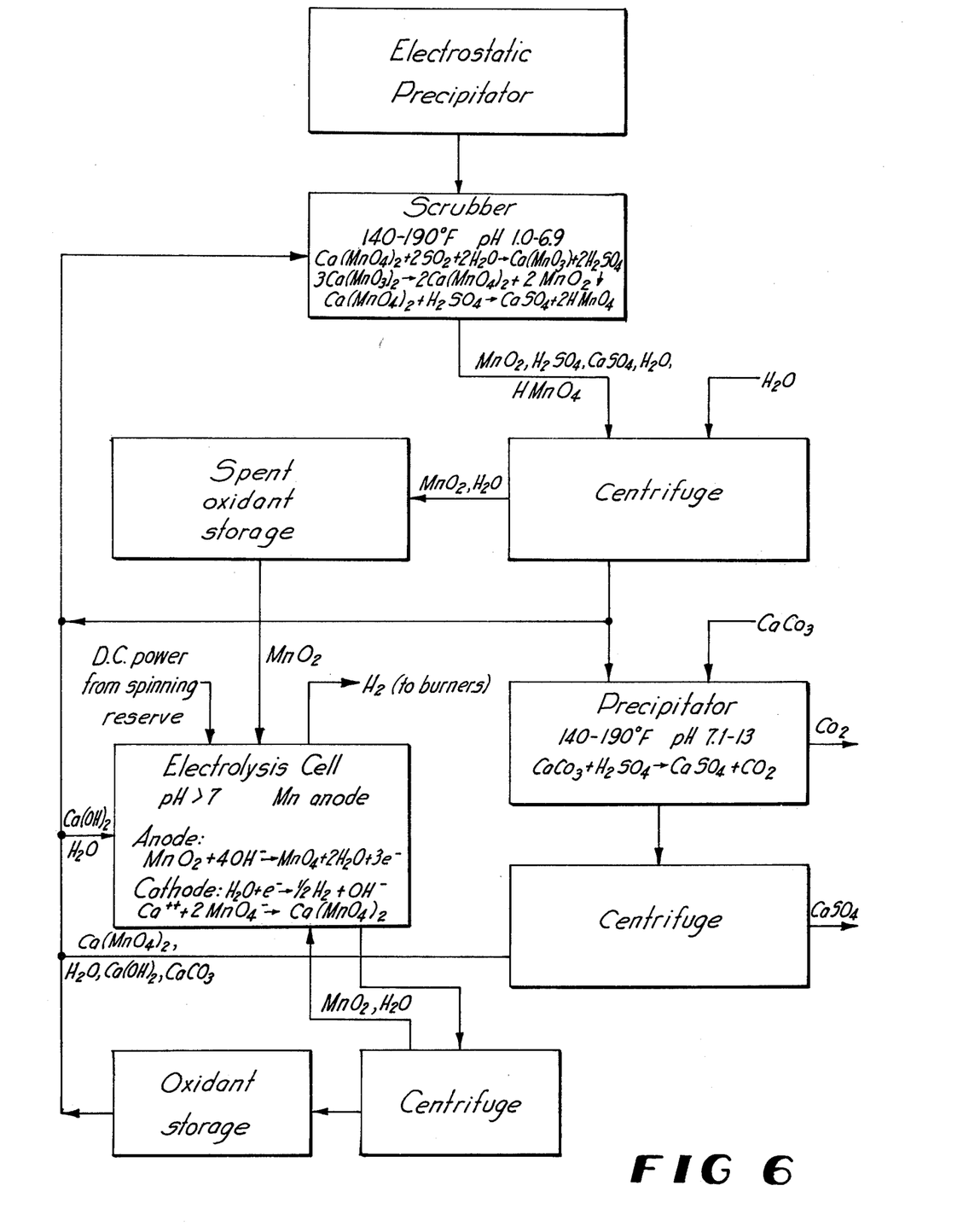
FIG. 6 is a flow diagram illustrating a permanganate oxidant.
Figure 7:
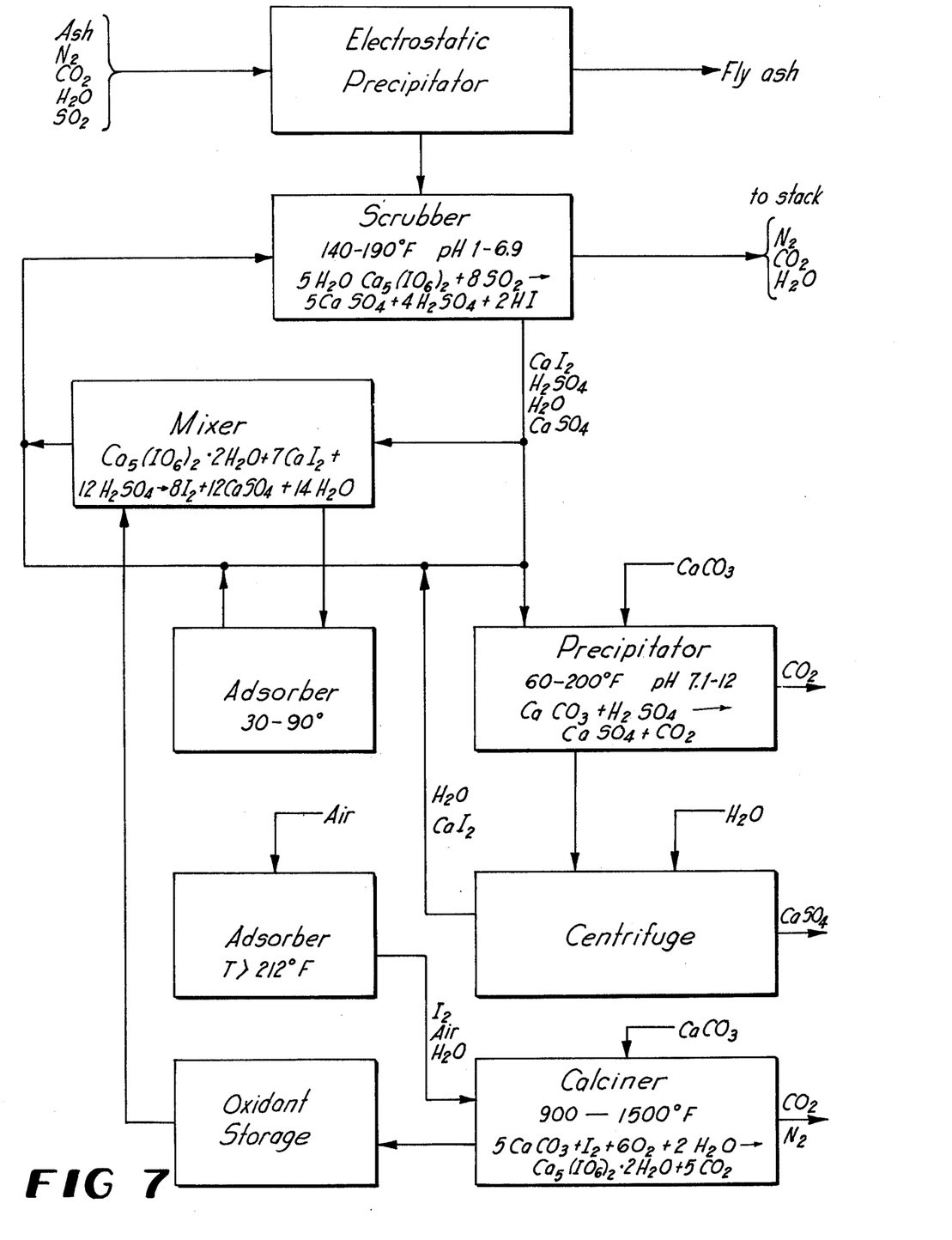
FIG. 7 is a flow diagram showing a system employing periodate oxidant.
Figure 8:
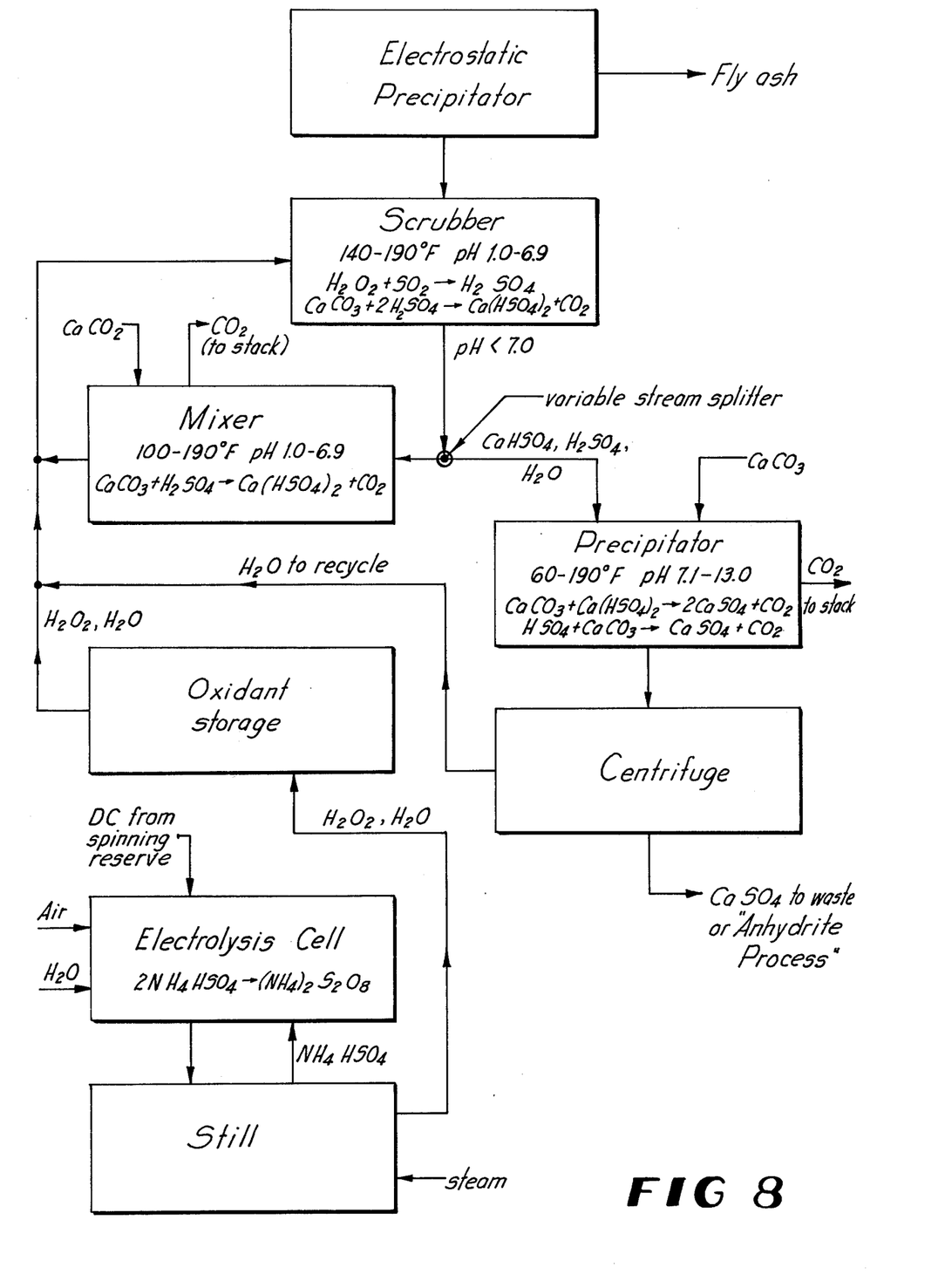
FIG. 8 is a flow diagram showing a system employing hydrogen peroxide as oxidant.

A system employing chromate as oxidant in the scrubber is illustrated in FIG. 5; periodate as oxidant is illustrated in FIG. 7; and the use of hydrogen peroxide as oxidant is illustrated in FIG. 8.

What is claimed is:

1. The method of quantitative removal of sulfur dioxide from effluent gases, which comprises the steps of:
   a. contacting an aqueous medium containing essentially $BaO_2$ with effluent gases which contain $SO_2$ for a time sufficient to absorb the $SO_2$ and to generate an amount of $H_2O_2$ to convert the $SO_2$ to $BaSO_4$, the amount of $H_2O_2$ being generated in response to a demand initiated by absorption of the $SO_2$ so that the medium is maintained at a pH ranging from 1.0 to 6.9; and
   b. removing the $BaSO_4$ from the aqueous medium.

2. The method for quantitative removal of $SO_2$ from effluent gases, which comprises the steps of:
   a. passing effluent gases which contain $SO_2$ through a scrubbing liquid which is an aqueous medium containing essentially $BaO_2$ whereby the medium absorbs the $SO_2$ and $H_2O_2$ is generated to convert the $SO_2$ to $BaSO_4$, the amount of $H_2O_2$ generated controlled by the rate of absorption of $SO_2$ into the medium which is maintained at a pH ranging from 1.0 to 6.9;
   b. separating the $BaSO_4$ from the scrubbing liquid;
   c. reducing at an elevated temperature the $BaSO_4$ to $BaS$;
   d. reacting the $BaS$ with $CO_2$ at an elevated temperature to form $BaCo_3$;
   e. firing the $BaCO_3$ to form $BaO$;
   f. oxidizing the $BaO$ to form $BaO_2$; and
   g. recycling the $BaO_2$ of step (f) to the scrubbing liquid, thereby forming a closed system.

3. The method as claimed in claim 2 wherein the $H_2S$ formed in the reaction of step (d) is recovered and including the steps of burning a portion of the $H_2S$ to produce $SO_2$ and reacting the $SO_2$ so produced with the remained of the $H_2S$ to recover elemental S.

* * * * *